United States Patent [19]

Linder

[11] 4,138,888
[45] Feb. 13, 1979

[54] ELECTROMAGNETIC MEASUREMENT OF LEVEL AND/OR DISTANCE FOR ELECTRICALLY CONDUCTING LIQUID MATERIAL

[75] Inventor: Sten V. Linder, Tystberga, Sweden

[73] Assignee: Aktiebolaget Atomenergi, Stockholm, Sweden

[21] Appl. No.: 797,656

[22] Filed: May 17, 1977

[30] Foreign Application Priority Data

May 20, 1976 [SE] Sweden .................................. 7605760

[51] Int. Cl.² ........................................... G01F 23/00
[52] U.S. Cl. .................................................. 73/290 R
[58] Field of Search ............. 73/290 R; 361/179, 180; 324/236; 336/30; 340/196, 244 R

[56] References Cited

U.S. PATENT DOCUMENTS

| 3,834,234 | 9/1974 | Kobayashi et al. ................. 73/290 R |
| 4,007,636 | 2/1977 | Wahl .................................. 73/290 R |

Primary Examiner—Jerry W. Myracle
Attorney, Agent, or Firm—Burns, Doane, Swecker & Mathis

[57] ABSTRACT

An arrangement for electro-magnetically measuring level of and/or distance to molten metal contained in a container, particularly a torpedo ladle wagon. Separate transmitter and receiver coils are located displaced relative to each other at or in the container walls so that the molten metal forms an AC magnetic screen between the coils when reaching a predetermined level. Before the molten metal cuts off the alternating magnetic field from the transmitter coil to the receiver coil, the alternating magnetic field sensed by the receiver coil is increased due to alternating magnetic field generated by electric currents induced at the surface of the raising molten metal. The top amplitude of the signal obtained in the receiver coil increases as the wear and erosion of the container lining proceeds.

21 Claims, 9 Drawing Figures

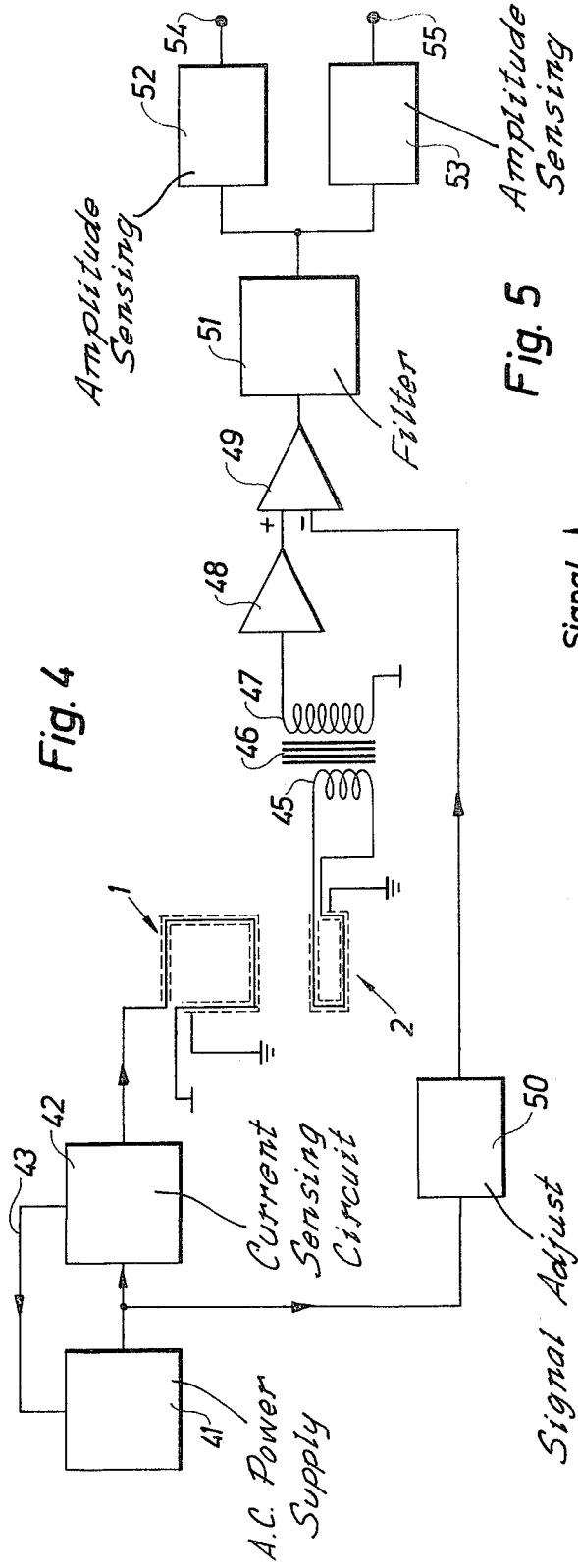
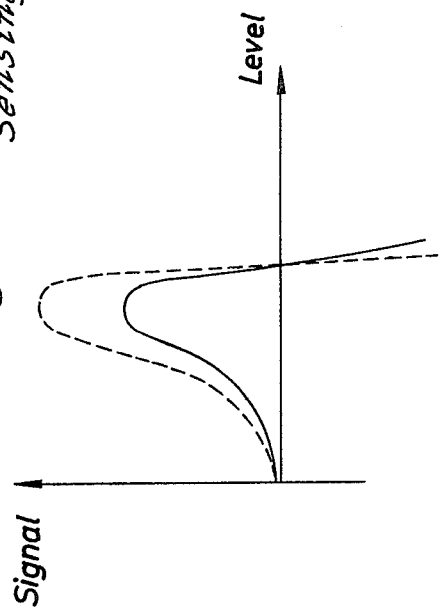
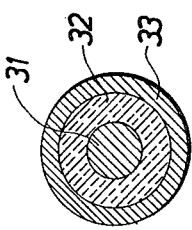

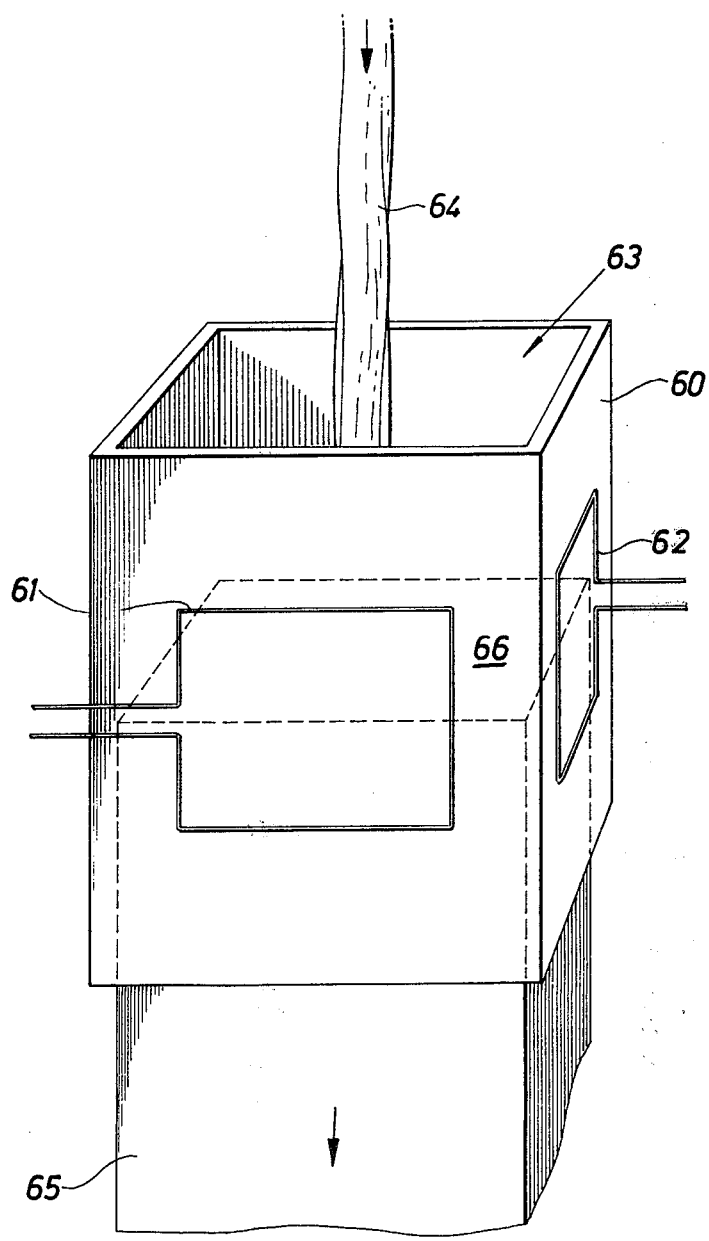

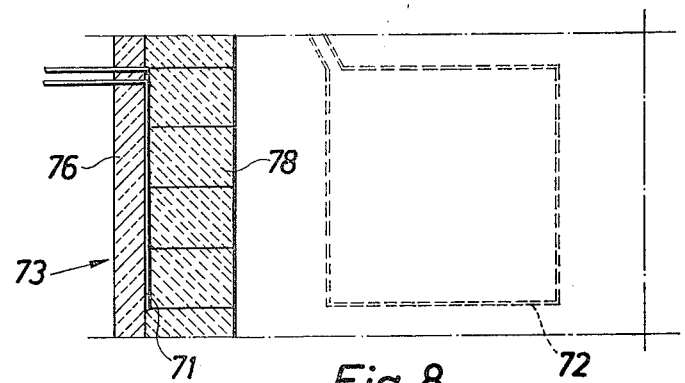
Fig. 7
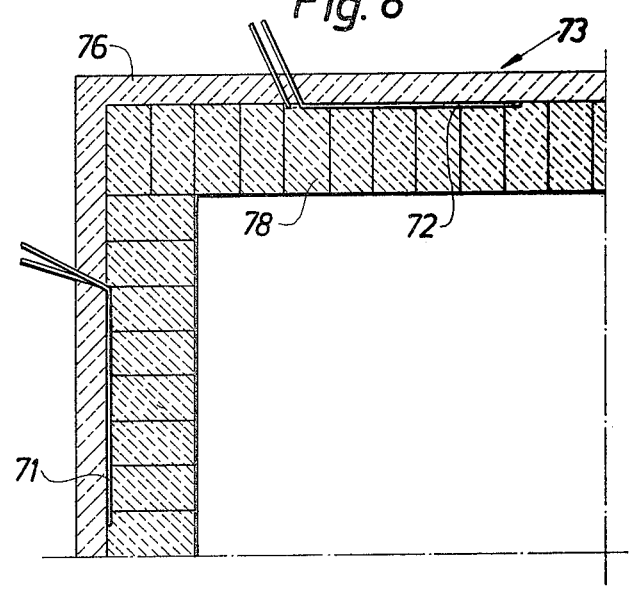
Fig. 8
Fig. 9
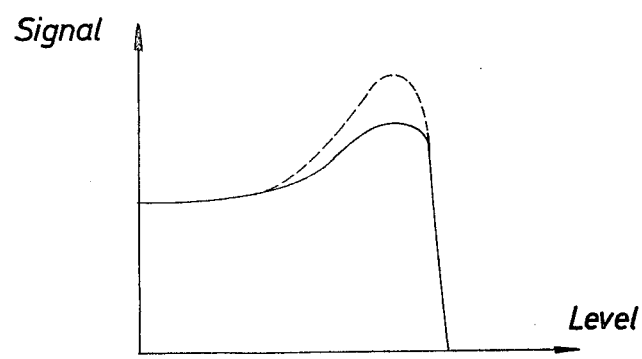

ELECTROMAGNETIC MEASUREMENT OF LEVEL AND/OR DISTANCE FOR ELECTRICALLY CONDUCTING LIQUID MATERIAL

CROSS REFERENCE TO RELATED APPLICATIONS

This application is related to the following applications all of which were filed on even date herewith and all of which are incorporated by reference herein: ELECTROMAGNETIC MEASUREMENT OF QUANTITIES IN CONNECTION WITH ELECTRICALLY CONDUCTING LIQUID MATERIAL, U.S. Ser. No. 797,654; and COIL ARRANGEMENT FOR ELECTROMAGNETIC MEASUREMENTS, U.S. Ser. No. 797,655.

This invention relates to electromagnetic measurement of level and/or distance in connection with liquid electrically conducting material contained in a container ("container" also including a channel or the like). More particularly, the invention relates to an arrangement for such measurement which arrangement is specifically suitable for use in connection with electrically conducting material of a very high temperature, such as molten metal.

In industries, primarily metallurgical industries, in which molten liquid electrically conducting material is handled there is a great need for arrangements for measuring the level of the liquid material in containers such as torpedo ladle wagon, moulds for continuous casting, furnaces and ladles, etc. Lately, this need has been accentuated because of a change to a large extent into continuous processes and into processes upon which great demands as to controlability are made. Due to the specific hard conditions met in connection with such industry, such as high temperatures, corrosive materials, the occurrence of much iron and other electrically conducting materials in the containers and surroundings, etc, up to now it has proved to be most difficult to provide a desirable measurement, in particular electromagnetically.

Nevertheless, arrangements for electromagnetic measurement in connection with melting furnaces have been proposed which comprises three coils arranged on an E-shaped iron or ferromagnetic core, the core being arranged in a specific recess in the lined wall of the furnace in a direct connection to the contained melt. However, in practice such arrangements have proved to be associated with difficult problems, especially due to the high temperature and the cooling required thereby, and to have poor reliability although the price is high. Therefore, such arrangements have not been commonly used.

In industries of the kind discussed there is also a great need for arrangements for measuring and indicating the often very rapid wear and erosion of the linings of a refractory material which in most cases are found within the container containing the liquid electrically conducting material, because it is of great importance, from the safety point of view and also from the economic point of view, to be able to determine exactly when the container must be taken out of operation and be provided with a new lining.

For this purpose it has been proposed to insert elements into the lining, for instance thermoelectric couples or conductor loops arranged stepwise which are destroyed as the wear and erosion proceeds, thereby causing electrically detectable conditions indicating how far the wear and erosion has proceeded.

However, these solutions have many drawbacks, such as that the elements inserted must be replaced when exchanging the lining, that a plurality of elements and a related great number of lead-in wires are involved which among other things requires a substantial connecting network, that other phenomena than those intended influence the measurements, etc. Therefore, arrangements of the above-mentioned types have not been largely used either.

Therefore, the object of this invention is to provide a novel improved arrangement of the kind stated in the introductory paragraph which among other things makes it possible to measure both level and distance (that is, wear and erosion); uses simple and easily positioned and generally speaking resistive elements in association with the liquid electrically conducting material, so that a long working life is obtained also in connection with frequent exchange of lining when the elements are positioned therein; has a great flexibility which makes it easily adaptable to different applications; gives exact and easily readable measurement values; and also otherwise lacks the drawbacks discussed above.

The above-mentioned object is achieved by the arrangement of the invention having been given the features defined in the appended claims.

Thus, the arrangement of the invention is essentially characterized in that it comprises an AC power supply, a separate and essentially freely positionable transmitter or excitation coil arranged in association with the wall of the container and arranged to be energized from said AC power supply for producing an alternating magnetic field in connection with the liquid electrically conducting material, a separate and essentially freely positionable receiver or sensing coil arranged in association with the wall of the container in spaced relation from said transmitter coil and arranged for sensing alternating magnetic field deriving from the AC energization of the transmitter coil, said transmitter and receiver coils being arranged relative to each other such that the receiver coil senses the alternating magnetic field as long as the level of the liquid electrically conducting material is below a predetermined level given by the location of said coils in association with the wall of the container and such that the receiver coil senses considerably less of alternating magnetic field due to the screening effect of the liquid electrically conducting material when the level of the material exceeds the predeterminated level, and signal processing means connected to the receiver coil for detecting and processing AC signals induced in the receiver coil by said alternating magnetic field.

Thus, the liquid electrically conducting material will act, when its level raises, as an AC magnetic screen between the transmitter and receiver coils.

Suitably, the transmitter and receiver coils are arranged displaced relative to each other in such a way that when the level of the liquid material is considerably below the predetermined level the receiver coil senses merely an insignificant portion of the alternating magnetic field produced by the transmitter coil and that when the lead of the liquid material raises towards the predetermined level the receiver coil senses a more and more stronger alternating magnetic field due to the influence of electric currents induced at the surface of the liquid material by the alternating magnetic field produced by the transmitter coil With the word "separate" it is to be understood that the coils are not mechanically attached to each other, as is the case for instance when coils are wound on a common coil former. Thus, the coils can be arranged on a considerable distance from each other. In any case, the distance between the coils should be greater than the least distance between the electrically conducting material and a coil.

Preferably, the receiver coil is located so that its plane is essentially perpendicular to the magnetic field produced by the transmitter coil as well as to the magnetic field produced by current induced in the liquid electrically conducting material.

The transmitter coil can be arranged substantially in a first plane and the receiver coil can be arranged substantially in a second plane, said first and second planes forming an angle with themselves. The coils can be arranged so that their axes lie in one and the same plane. One of the coils can be arranged above the surface of the liquid electrically conducting material, the axis of said coil being directed towards the surface, preferably substantially at right angles to the surface, the other of the coils being arranged in a side position relative to the liquid electrically conducting material.

The coils can be arranged essentially in one and the same plane, beside and at a distance from each other.

The coils can also be arranged in planes which are essentially parallel and lie on opposite sides of the liquid electrically conducting material. Such an opposite location can be used for instance when the geometry or configuration as to the rest does not permit a location in which the planes of the coils form an angle of for instance 90°. This can be the case when measuring at an open channel.

The coils are coreless, each of them in most cases including only a few turns, preferably one single turn. This means that difficult problems with the insulation between coil turns are removed, which problems above all are caused by the high operating temperatures which can cause precipitation of carbon on coil turns positioned in connection with bricks and which can also cause displacements of wire turns relative to each other. The simple design of the coils makes it possible to locate the coils easily within or behind a refractory lining, suitably so that the conductors of the coils are located in the joints between the separate bricks of the lining. Also, the simple design makes it possible to give the coils a substantial size, without the coils being unhandy, and to have the coils installed by the personnel who normally provide the container with its lining. Advantageously, the conductors of the coils are encased in an electrically conducting sheath, while being insulated therefrom said sheath being non-short-circuiting and non-magnetic. Preferably, the sheath is made of a stainless steel or another thermally resistive material. One end of the sheath can be grounded. This means that the coils will be resistive in a general sense, as well as electrically screened, so that the sensitivity to electrical disturbances is reduced. Suitably, the coil connection leads are located on the outside of the container in steel tubes extending to a place of connection to screened cables from the AC power supply, signal processing means and other similar equipment.

The signal processing means comprise means for determining the magnitude of the signal detected in the receiving coil and means for producing a control signal in dependence thereon. Suitably the control signal is produced when the magnitude of the detected signal after having exceeded a top value drops again, that is when the screening effect mentioned previously begins. This effect is most pronounced, that is the magnitude of the signal decreases rapidly. Consequently, the effect is well-defined and easy to observe.

It has been found that the top value of the detected signal is strongly dependent on the wear and erosion of the lining of the container, when at least one of the coils is arranged in association therewith. Thus, determination and monitoring of said top value make it possible to watch the wear and erosion and to determine when a new lining has to be installed.

In order to obtain reproducable measurement results it is of importance that the alternating magnetic field produced by the transmitter coil does not vary as to its strength, not even at varying operating conditions, for instance at varying temperature. For this purpose the AC power supply suitably is arranged for constant current supply of the transmitter coil, whereby the influence of for instance a varying resistance of the transmitter coil due to a carying temperature is eliminated, because the strength of the alternating magnetic field produced is proportional to the product of the inductive reactance of the coil and the current strength.

In order to keep the basic signal obtained, that is the output signal with no or little liquid material in the container, as low as possible (and thereby the relative signal increase at increasing level for the liquid material as large as possible) and in order to reduce the influence of disturbances from the surrounding areas still more, suitably, from the signal obtained from the receiver coil there is subtracted a signal being a proper fraction of the signal supplied to the transmitter coil, so that the basic signal obtained will be substantially zero. In view of occurring phase-shifts it can then be suitable also to introduce properly adjusted phase-shift either for said fractional signal or for the signal obtained from the receiver coil.

It is to be pointed out that a coil arrangement in accordance with this invention gives a very characteristic signal course in that the signal to begin with increases to a top value and thereafter decreases or drops rapidly. This is of essential importance with regard to the usefulness of the invention particularly in connection with the filling of a container, because the characteristic signal course can be detected and mean a safe criterion on the fact that the measuring system operates properly in every respect. Furthermore, the invention makes it possible to measure level with accuracy independent of the extent of wear and erosion of the container wall, because the ratio between maximum signal value and the signal defining a given level does not change as the wear and erosion proceed but merely is dependent on the location of the coils used.

The invention will now be described in more detail by way of embodiments while referring to the accompanying drawings, in which:

FIG. 3 shows a cross-section through a lead of the type used for the coils shown in FIGS. 1 and 2;

FIG. 4 shows a circuit diagram, mainly as a block diagram, of an arrangement according to this invention;

FIG. 5 shows a schematic graphic representation illustrating how the output signal obtained in the arrangement of FIGS. 1 and 2 varies in accordance with the level of the liquid electrically conducting material;

FIG. 6 shows a schematic perspective view of a mould for continuous casting which is provided with coils included in an arrangement according to this invention.

FIGS. 7 and 8 show a schematic vertical partial section and a horizontal partial section, respectively, through a furnace or a mould, the furnace or mould being provided with coils arranged in an additional way and included in an arrangement according to this invention, and FIG. 9 shows a schematic graphic representation illustrating how the output signal obtained varies in accordance with the level of the liquid electrically conducting material when an arrangement of FIGS. 7 and 8 is used.

Figure 1:
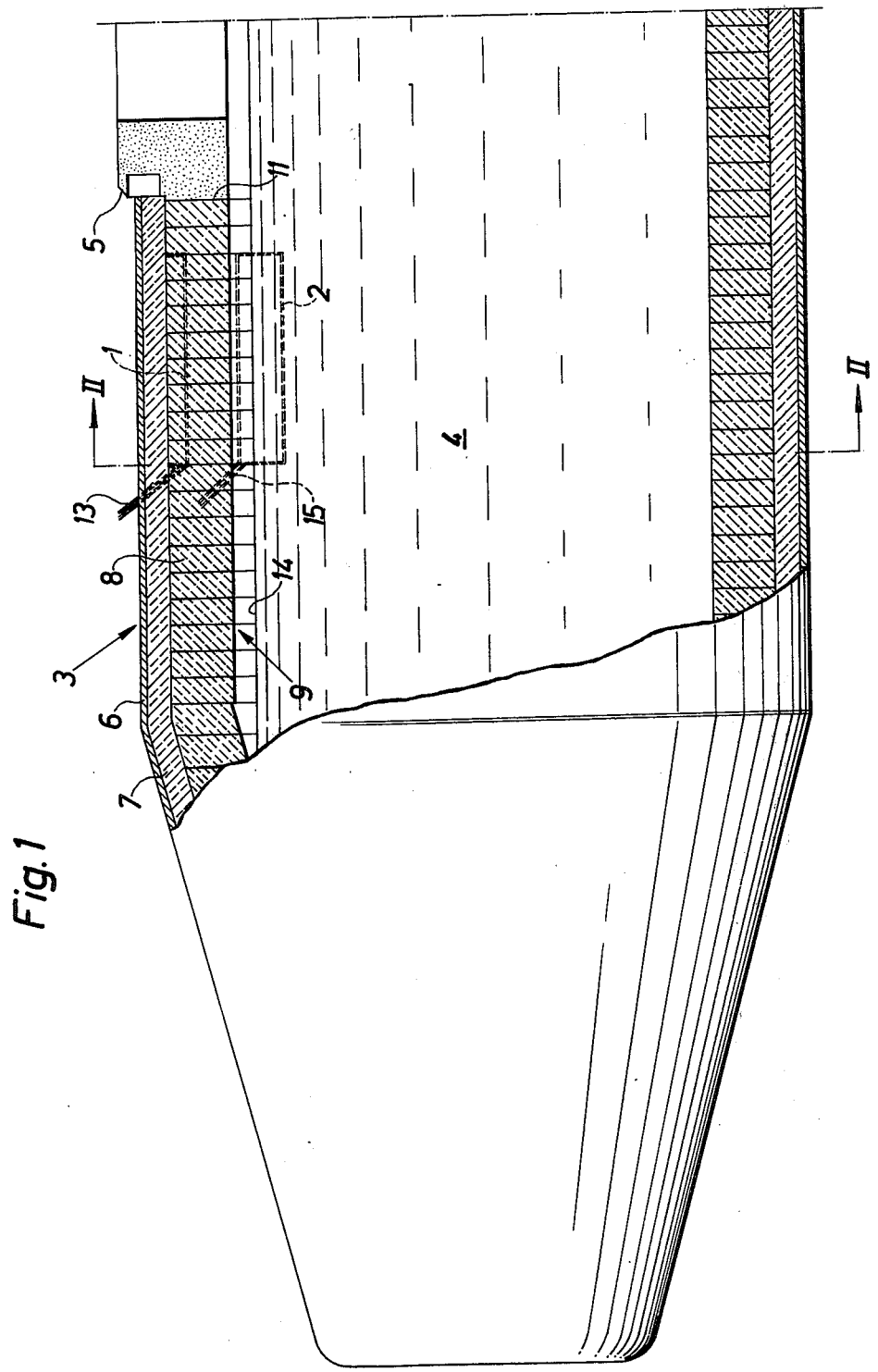
FIG. 1 shows a partial longitudinal section through a torpedo ladle wagon, said wagon being provided with coils included in an arrangement according to this invention.
Figure 2:
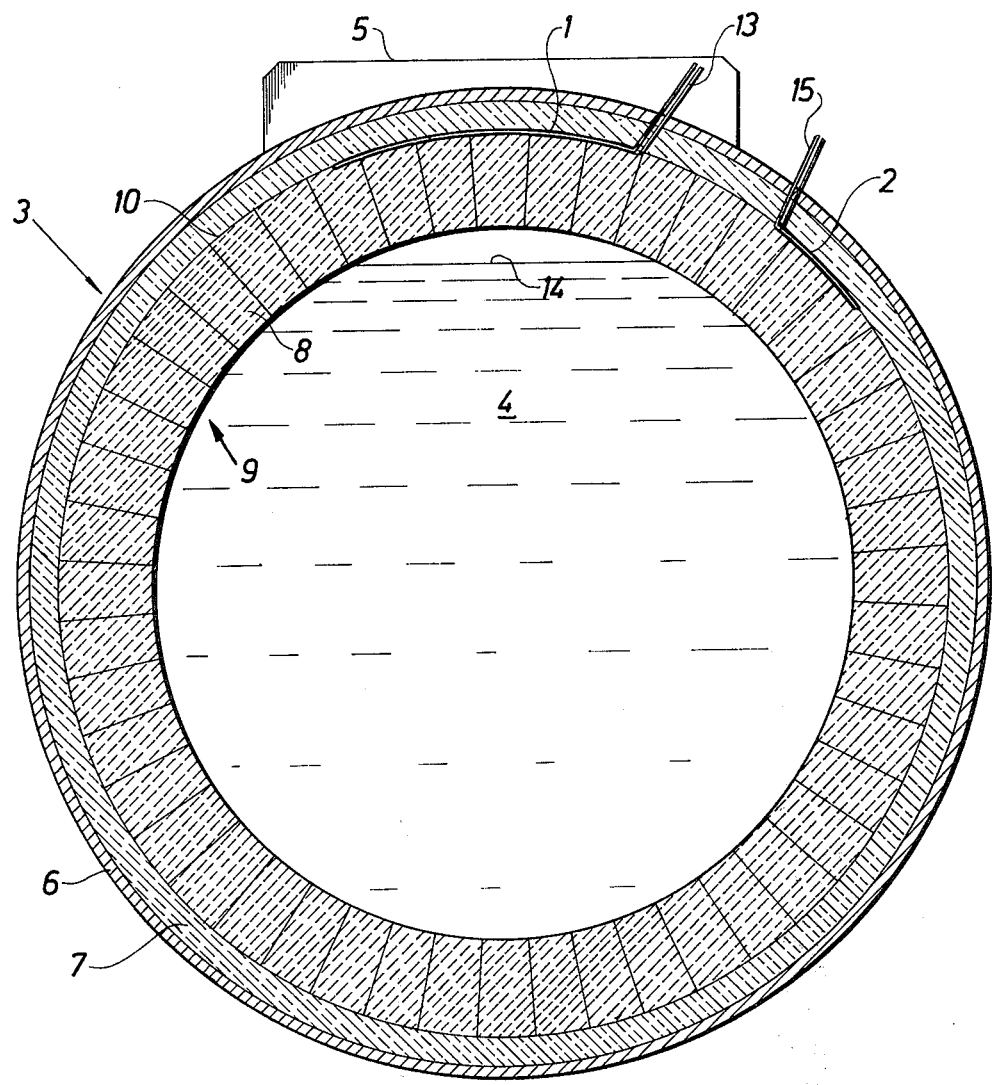
FIG. 2 shows a cross-section through the part of the torpedo ladle wagon illustrated in FIG. 1, the cross-section being taken along the line II—II of FIG. 1.

Referring now to FIGS. 1 and 2, said figures illustrate how a transmitter coil 1 and a receiver coil 2 according to the invention are arranged in a conventional torpedo ladle waggon 3 for molten metal, the wagon being substantially cigar-shaped. The coils are arranged in the circular-cylindrical central part of the torpedo ladle waggon near the material charging and discharging section 5 of the torpedo ladle wagon, said section being located in the middle of the wagon and provided with an opening. As commonly known, the torpedo ladle wagon comprises an outer steel casing, a thermal insulation 7 and a lining 9 built up by refractory bricks 8, the coils 1 and 2 being arranged in association with said lining.

The transmitter coil 1 is located in the uppermost part of the torpedo ladle wagon and is square, the side being in the order of 1 m. The transmitter coil consists of one single horizontal lead turn, the two longitudinal sides or portions thereof being parallel to and located symmetrically relative to the longitudinal axis of the torpedo ladle wagon 3 in the transition zone 10 between the insulation 7 and the end surfaces of the refractory bricks 8 which face the outside of the wagon. The transverse sides or portions of the lead turn are shaped so that they also follow the cylindrical transition zone between the insulation 7 and the end surfaces of the refractory bricks 8 which face the outside of the wagon, although in this case at right angles to the longitudinal axis of the torpedo ladle wagon. The connection leads 13 of the transmitter coil 1 are passed directly out through the insulation 7 and the steel casing 6 from one corner of the coil in any suitable way (not shown). The connection leads 13 consist of extensions of the coil lead turn. On the outside of the torpedo ladle wagon the connection leads 13 are connected to conventional leads passing through steel tubes (not shown) for connection with an AC power supply, as shown in the diagram of FIG. 4.

The receiver coil 2 is located in the side part of the torpedo ladle wagon and is rectangular, the longer sides being of the order of 1 m and the shorter sides being of the order of 0.3 m. The receiver coil also includes one single planar lead turn. The longitudinal sides or portions of the single lead turn extend horizontally and parallel to the longitudinal axis of the torpedo ladle wagon 3 in the above-mentioned transition zone 10 between the insulation 7 and the refractory bricks 8. The transverse sides or portions of the lead turn extend at right angles to the longitudinal axis of the torpedo ladle wagon in the transition zone between the insulation 7 and the refractory bricks 8. The transverse sides or portions of the transmitter coil 1 and the receiver coil 2 are located in the same vertical cross-section, that is the coils are located in the same longitudinal section of the torpedo ladle wagon and have the same longitudinal extension. However, the plane of the receiver coil 2 forms an angle of about 135° with the plane of the transmitter coil 1, the angle intended being the angle facing the liquid electrically conconducting material 4. Thus, the axes of the coils which are perpendicular to the respective planes thereof form an angle of about 45° with each other. The upper longitudinal side of the receiver coil 2 is substantially on a level with the desired filling level (that is, the desired level of the surfaces 14 of the liquid material 4) in the torpedo ladle wagon, that is just below the underside of the uppermost bricks 8 or just below the uppermost level of the inner room of the torpedo ladle wagon, while the transmitter coil 1 lies above the surface 14. The axis of the receiver coil 2 extends perpendicularly to and through the longitudinal centre axis of the torpedo ladle wagon. Besides, this is the same for the axis of the transmitter coil 1, which is preferably perpendicular to the surface 14. As to the connection leads 15 of the receiver coil 2, the same conditions apply as those mentioned above in connection with the connection leads 13 but for the fact that the leads connected thereto are connected to the signal processing means of the arrangement, as shown in the diagram of FIG. 4.

Referring now to FIG. 3, there is shown a cross-section through a side or portion of a lead turn for the transmitter or receiver coil. As shown, the coil lead according to the invention comprises an inner wire 31 of "Kanthal", a high temperature resistive insulation 32 of ceramic material and surrounding said wire and an outer sheath 33 of stainless steel. In this way there is obtained a coil which is most insensitive to influence in a general sense and is mechanically rigid and, consequently, easy to handle. Also, the very conductor 31 runs little risk of being influenced or undergoing a change. The sheath 33 which screens off electrical disturbances can be grounded at one end, as shown in FIG. 4.

Referring now to FIG. 4, there is shown a combined circuit and block diagram of an embodiment of an arrangement according to this invention, the embodiment being suitable for use in connection with an installation according to FIGS. 1 and 2. The arrangement comprises an AC power supply 41 feeding a transmitter coil 1 via a current sensing circuit 42. The circuit 42 is arranged to supply the AC power supply 41 with a control signal via a line 43, the control signal being dependent on the current strength supplied to the transmitter coil, so that the transmitter coil 1 is supplied with constant current strength. Such an operation for keeping a constant current strength in a conductor is well known per se to those skilled in the art and, therefore, need not be described in more detail in this specification.

A receiver coil 2 is connected to the primary winding 45 of a transformer having a ferrite core 46, the secondary winding of the transformer being connected to the input of an amplifier 48. The transformer is positioned close to the receiver coil 2 and is encased in a steel sheath, so that the transformer, the receiver coil and connection leads are completely screened from interference or disturbing fluids. The output of the amplifier 48 is connected to one input of the differentiating circuit or amplifier 49. The other input of the circuit 49 is fed from the AC power supply 41 via a circuit 50. This circuit is arranged for adjustable control of the amplitude and/or the phase of the signal fed to said other input of the circuit 49, so that in the absence of the liquid material in the container in which the coils 1 and 2 are arranged the basic signal obtained from the circuit 49 or from the following circuits is substantially zero. The output of the circuit 49 is connected to the input of a high or band pass filter circuit 51 designed for the selected operating frequency and optionally having built-in amplification. The output of the filter circuit 51 is connected to signal processing means 52 and 53 including first and second amplitude sensing circuits 52 and 53, respectively. The first amplitude sensing circuit 52 is arranged to produce a first control signal on the output 54 when the amplitude of the signal from the circuit 51 has exceeded a first predetermined level and thereafter dropped markedly below a second predetermined level which preferably is a predetermined fraction of the top value passed by the signal. The first control signal is intended for actuating for instance a means controlling the supply of material to the container in order to stop said supply. The other amplitude sensing circuit 53 is arranged to produce a second control signal on the output 55. The second control signal is proportional to the top amplitude value of the signal from the circuit 51 and accordingly to the wear and erosion of the lining in the container. This second control signal can be read more or less continuously by means of any suitable reading instrument or can be monitored or watched by means of an alarm circuit which alarms when said control signal has reached a predetermined level.

Since it must be considered obvious to those skilled in the art how the amplitude sensing circuits could be designed, for instance while using rectifying means, voltage comparators, gate and logic elements, etc., a closer description thereof should not be necessary.

As to the dimensioning of the arrangement according to FIG. 4, the following guiding values can be given:

Operating frequency: one or a few kHz
Current through transmitter coil: of the order of 1–10A
Resistance of transmitter coil: of the order of 1–10A
Resistance of receiver coil: of the order of 10Ω
Inductive reactance of primary winding (transformer): of the same order as the resistance of the receiver coil
Ratio of transformation (transformer): of the order of 5–50

Referring now to FIG. 5, there is shown the typical dependency of the magnitude of the output signal from for instance the circuit 51 of FIG. 4 on the level of the liquid electrically conducting material in the container in which the coils 1 and 2 are installed. In the figure the unbroken curve relates to the conditions when the lining is new, while the broken curve relates to the condition when the lining has been heavily eroded. As is evident from the curves, the magnitude of the signal increases up to a level of the material at which the alternating magnetic field passing through the receiver coil stops increasing, because the magnetic field which has been compressed due to the influence of the liquid electrically conducting material begins to fall more and more outside the receiver coil. Thus, the screening effect of the electrically conducting material begins to manifest itself. Shortly thereafter, the signal drops very rapidly and markedly when the receiver coil becomes completely screened. As is also evident from the curves, it has been found that the magnitude of the signal, at one and the same level, greatly increases when the lining is eroded or eaten away. However, the ratio between a signal and the top value always defines a specific level in an accurate way. This means that the excellent accuracy of the level measurements can be maintained while the wear or erosion proceeds without any need for recalibrations or adjustments. At the same time it is possible to follow or watch the wear or erosion quite easily by detecting the top value of the signal.

It should be noted that an arrangement according to this invention gives an inherent function check or test in that the signal curve should have the predetermined course when the function or operation is faultless.

Referring now to FIG. 6, said figure in a very schematic way illustrates one example of how the coils of an arrangement according to this invention can be arranged in connection with level sensing and control in continuous mould casting. The mould comprises, in a conventional manner, an inner copper shell 60 having a thickness of for instance about 10 mm and having a vertical casting channel 63 all through, the channel having a rectangular cross-section in the example shown. The copper shell 60 is surrounded by a casing (not shown) which makes it possible to cool the copper shell by circulating a cooling medium in the room between the copper shell an the casing not shown. Molten material is supplied to the casting channel from above in the form of a stream 64 and a frozen strand of material 65 is pulled out from below, as is shown in the figure. The supply of molten material and the pulling out of the strand of material ought to be controllable so that the level of the surface 66 of the still liquid material inside the copper shell 60 is maintained as constant as possible. However, such a control requires that the level of the molten material inside the copper shell can be determined. This becomes possible by means of an arrangement according to this invention.

A single-turn generally rectangular transmitter coil 61 of the type described previously is arranged vertically adjacent an outer side surface of the copper shell 60. The transmitter coil has a width of the same order as the width of said side surface and is arranged so that its centre is substantially on a level with or somewhat below the desired level for the molten material inside the copper shell 60. In other words the transmitter coil is arranged essentially about the middle of the side surface of the copper shell.

A single-turn generally rectangular receiver coil 62 is arranged vertically adjacent a second outer side surface of the copper shell 60. The receiver coil, the plane of which is thus angled 90° relative to the plane of the transmitter coil, has a width of the same order as the width of said second outer side surface.

The coils 61 and 62 are of the same height and are arranged at the same level.

The coils 61 and 62 can be made in accordance with what has been described previously in connection with FIG. 3. However, since the coils 61 and 62 can be arranged in the cooling room between the copper shell and the surrounding casing not shown and consequently are exposed to lower temperatures, the coils also can be of a more simple design. In these cases even multi-turn coils can be used.

Suitably, the coils 61 and 62 are connected to a circuit according to FIG. 4. However, the signal processing means 52 and 53 can be replaced by a simple signal amplitude sensing means for producing a control signal which varies in dependence on the level of the molten material inside the copper shell 60. This control signal can be used for providing the the above-mentioned desirable control.

The control signal obtained will have a course, that is, a level dependence, which essentially is in conformity with that shown in FIG. 5. In order to obtain the best controlability, the desired level inside the copper shell should be the level at which one is approximately at the centre of the substantially linear falling flank of a curve according to FIG. 5. This means that the desired level approximately coincides with the horizontal centre line of the transmitter coil 61 or lies somewhat above said centre line.

Referring now to FIGS. 7 and 8, said figures schematically illustrate how a transmitter coil 71 and a receiver coil 72 according to the invention can be arranged in the wall of a furnace or mould 73. The coils, in this case shown to be square single-turn coil of equal size, are arranged between the insulating outer casing 76 of the furnace and the refractory brick lining 78 of the furnace and in association with a corner of the furnace. The planar coils are located at the same level and symmetrically relative to the corner of the furnace. Thus, the coils form an angle of 90° with each other.

The coils 71 and 72 can be connected to a circuit arrangement essentially corresponding to that shown in FIG. 4 with the exception that the circuit 50 and the belonging connection between the circuits 41 and 49 has been omitted. The typical dependence of the magnitude of the output signal obtained on the level of the electrically conducting material within the furnace is shown in FIG. 9. Also in this case, the unbroken curve relates to the conditions when the lining is new and the broken curve relates to the conditions when the lining has been heavily eroded.

Although the invention has been described more closely by way of specific embodiments, it is to be understood that the invention is not limited thereto but changes and modifications are possible within the scope of the appended claims. Thus, as an example it is possible to double or multiply the transmitter and/or receiver coil in order to increase the alternating magnetic field produced and/or the portion thereof which is sensed or in order to obtain balanced conditions or to provide an unambiguous relationship between the signal amplitude obtained and the quantity to be measured.

What is claimed is:

1. An arrangement for electromagnetically measuring at least one of level and distance in connection with liquid electrically conducting material contained in a container, particularly electrically conducting molten material of a very high temperature, such as molten metal, comprising:

an AC power supply;
a separate transmitter coil arranged in association with the wall of the container and arranged to be energized from said AC power supply for producing an alternating magnetic field in connection with the liquid electrically conducting material;
a separate receiver coil arranged in association with the wall of the container at a distance from said transmitter coil and arranged for sensing alternating magnetic field deriving from the AC energization of the transmitter coil;
said transmitter and receiver coils being arranged relative each other such that the receiver coil senses the alternating magnetic field when the level of the liquid electrically conducting material is below a predetermined level given by the location of said coils in association with the wall of the container and such that when the level of the liquid material raises towards the predetermined level the receiver coil senses a more and more strong alternating magnetic field due to the influence of electric current induced at the surface of the liquid material by the alternating magnetic field produced by the transmitter coil and such that the receiver coil senses considerably less of alternating magnetic field due to the screening effect of the liquid electrically conducting material when the level of the material exceeds the predetermined level; and
signal processing means connected to the receiver coil for detecting and processing AC signals induced in the receiver coil by said alternating magnetic field.

2. An arrangement according to claim 1, wherein said transmitter and receiver coils are displaced relative to each other in such a way that when the level of the liquid material is considerably below the predetermined level the receiver coil senses merely an insignificant portion of the alternating magnetic field produced by the transmitter coil.

3. An arrangement according to claim 1 wherein the transmitter coil is arranged substantially in a first plane and the receiver coil is arranged substantially in a second plane said second plane being generally perpendicular to the magnetic field from the transmitter coil as well as to the magnetic field from currents induced in the liquid electrically conducting material.

4. An arrangement according to claim 1, wherein one of the coils is arranged above the surface of the liquid electrically conducting material, the axis of said coil being directed towards the surface, and wherein the other of the coils is arranged to have its axis directed substantially transversely to the axis of said one coil and to have its uppermost portion substantially on a level with the predeterminated level.

5. An arrangement according to claim 4, wherein the axis of said one coil is perpendicular to the surface of the material.

6. An arrangement according to claim 1, wherein one of the coils is arranged in association to a roof wall portion of the container, the axis of the coil being directed down into the container, and wherein the other of the coils is arranged in association with a side wall portion of the container, the axis of the other coil being directed into the container.

7. An arrangement according to claim 6, wherein the container is a torpedo ladle wagon, wherein said one coil has a generally planar configuration and is quadrilateral and is arranged substantially horizontally, two sides of said one coil being substantially parallel to the longitudinal direction of the torpedo ladle wagon, and wherein said other coil has a generally planar configuration and is rectangular and is arranged inclined relative to said one coil, the two longitudinal sides of said other being substantially parallel to the longitudinal direction of the torpedo ladle wagon, and the upper longitudinal side of said other coil preferably being substantially on a level with the desired level of the liquid electrically conducting material in the torpedo ladle wagon, the coils being arranged essentially in the same longitudinal section of the torpedo ladle wagon seen in the longitudinal direction of the torpedo ladle wagon.

8. An arrangement according to claim 1, particularly when the container is a mould for continuous casting, wherein one of the coils is arranged in association with a first side wall of the container, the axis of the coil being directed into the container, and wherein the other of the coils is arranged in association with a second side wall of the container, the axis of said other coil being directed into the container.

9. An arrangement according to claim 8, wherein the coils are arranged substantially on the same level.

10. An arrangement according to claim 1, wherein one of the coils is arranged in association with a first wall portion of the container, the axis of the coil being directed into the container, and wherein the other of the coils is arranged in association with a second wall portion, the axis of said other coil being directed into the container, the axis of the coils forming an angle with each other.

11. An arrangement according to claim 1, wherein at least one of the transmitter and the receiver coils are arranged in the container wall within an inner refractory lining.

12. An arrangement according to claim 1, wherein at least one of the transmitter and the receiver coils comprise at most a small number of conductor turns.

13. An arrangement according to claim 1, wherein the coils are coreless.

14. An arrangement according to claim 1, wherein the coils are electrically screened.

15. An arrangement according to claim 14, wherein the conductors of the coils are encased in a metal sheath while being insulated, said sheath being non-short-circuited.

16. An arrangement according to claim 1, wherein the signal processing means comprise means for determining the magnitude of the detected signal and means for producing a signal in dependence thereon.

17. An arrangement according to claim 16, wherein said signal processing means comprise means for producing a signal when the magnitude of the detected signal after having exceeded a first given value has dropped below a second given value.

18. An arrangement according to claim 16, wherein said signal processing means comprise means for determining the top value of the detected signal during a measuring process.

19. An arrangement according to claim 1, wherein the AC power supply is arranged for constant current supply of the transmitter coil.

20. An arrangement for electro-magnetically measuring at least one of level and distance in connection with liquid electrically conducting material contained in a container, particularly electrically conducting molten material of a very high temperature, such as molten metal, comprising:

an AC power supply;
a separate transmitter coil arranged in association with the wall of the container and arranged to be energized from said AC power supply for producing an alternating magnetic field in connection with the liquid electrically conducting material;
a separate receiver coil arranged in accordance with the wall of the container at a distance from said transmitter coil and arranged for sensing alternating magnetic field deriving from the AC energization of the transmitter coil;
said transmitter and receiver coils being coreless, at least one of said coils having at most a small number of conductor turns, and being arranged relative each other such that the receiver coil senses the alternating magnetic field when the level of the liquid electrically conducting material is below a predetermined level given by the location of said coils in association with the wall of the container and such that the receiver coil senses considerably less of alternating magnetic field due to the screening effect of the liquid electrically conducting material when the level of the material exceeds the predetermined level;
and signal processing means connected to the receiver coil for detecting and processing AC signals inducted in the receiver coil by said alternating magnetic field.

21. An arrangement according to claim 20, wherein at least one of the transmitter and receive coils are arranged in the container wall within an inner refractory lining.

* * * * *